United States Patent [19]

Jennings et al.

[11] 4,149,565
[45] Apr. 17, 1979

[54] PILOT CONTROLLED POPPET VALVE ASSEMBLY

[75] Inventors: Marvin D. Jennings, Naperville; Robert D. Barrett, Westchester, both of Ill.

[73] Assignee: International Harvester Company, Chicago, Ill.

[21] Appl. No.: 765,012

[22] Filed: Feb. 2, 1977

[51] Int. Cl.² .................. F15b 13/06; F16k 31/02; F16k 31/122
[52] U.S. Cl. ........................... 137/885; 60/484; 60/494; 91/459; 91/508; 137/596.12; 137/596.16; 251/26; 251/30; 251/44
[58] Field of Search ............. 91/414, 449, 454; 137/596.12, 596.16, 885; 251/26, 30, 44; 60/484, 494

[56] References Cited

U.S. PATENT DOCUMENTS

| | | | |
|---|---|---|---|
| 869,755 | 10/1907 | Tretch | 91/454 |
| 2,480,712 | 8/1949 | Carbon | 251/44 |
| 3,075,737 | 1/1963 | Cantalupo et al. | 251/26 |
| 3,422,728 | 1/1969 | Black et al. | 91/414 |
| 3,533,434 | 10/1970 | Smith | 251/26 |
| 3,825,026 | 7/1974 | Salerno et al. | 251/30 |
| 3,842,714 | 10/1974 | Coleman | 91/414 |
| 3,862,738 | 1/1975 | Stumpmeier | 251/44 |
| 3,864,913 | 2/1975 | Herrmann | 91/414 |
| 3,976,097 | 8/1976 | Brakel | 91/414 |

Primary Examiner—Martin P. Schwadron
Assistant Examiner—G. L. Walton
Attorney, Agent, or Firm—Douglas W. Rudy; Ronald C. Kamp; F. David AuBuchon

[57] ABSTRACT

A valve assembly is provided in which a first poppet member and at least one subsequent poppet member each having a valve face engageable with a valve seat between first and second passages. A first and a subsequent pilot valve is operative for selectively establishing communication between a fluid reservoir and a space at one side of a piston portion of each poppet member and a pair of restricted flow passages are provided in each poppet member between such space and the first and second passages, such restricted flow passages being preferably formed in the poppet members with ball check valves provided therein. Such restricted flow passages operate upon closure of the pilot valve to develop a static pressure in the space corresponding to the pressure in the one of the first and second passage which has the higher pressure therein so as to move the poppet member to and hold it in its closed position in response to pressures applied from either of the first and second passages. Preferably, a plurality of valve units are provided in a common valve body, each including a poppet member and a pilot valve.

3 Claims, 3 Drawing Figures

PILOT CONTROLLED POPPET VALVE ASSEMBLY

This invention relates to a pilot controlled poppet valve assembly and more particularly to an assembly which is highly reliable in operation while being economically manufacturable.

BACKGROUND OF THE PRIOR ART

Valve units have heretofore been provided which include a pilot valve for controlling movement on a poppet member operative to control flow at large volume rates. In such units, the poppet member is movable to a closed position in which a valve face thereof engages a valve seat to block flow between a pair of passages and is movable to an open position in which the valve face is spaced from the valve seat, with a flow path being provided between one of such passages and a space at one side of a piston portion of the poppet member to a closed position and with a pilot valve being operative between such space and a fluid reservoir for allowing movement of the poppet member to its open position. Such valve units have the advantage that the pilot valve requires little force for operation and may be operated by a solenoid and controlled from a remote location. At the same time, lifting of very heavy loads can be controlled. However, it has been found that such valves are subject to malfunctions especially where they are designed to control lifting of a load to a certain elevation and maintaining the load at such an elevation for an extended period of time. It is found that operations may occur in which the poppet member moves to an open position even though the pilot valve remains closed and as a result the load may be abruptly and rapidly lowered. The consequences of such an operation can be very serious, involving possible damage to expensive equipment and also in terms of the safety of persons who may be in the vicinity of the load when it is abruptly lowered.

SUMMARY OF THE INVENTION

This invention was evolved with the general object of overcoming the disadvantages of prior art valve constructions and of providing a valve assembly which is highly reliable in operation and which can control very heavy loads while being readily and economically manufacturable.

The invention is based in part upon the discovery that when the above-mentioned malfunctions of prior art valve units take place, the pressure in the passage which is coupled through a flow path to the shape at one side of a piston portion of a poppet valve is of reduced magnitude and, apparently, with leakage of fluid away from the space, pressures may be developed such that movement of the poppet member will be initiated to move the valve face thereof a substantial distance away from the valve seat and to allow flow of large quantities of fluid before the poppet member can be moved back to the closed position.

Prevention of such leakage would be very difficult, especially after a period of use of the valve in which some degree of wear and deterioration of sealing surfaces and elements will inevitably take place. It has been found, however, that even though it may not be possible to insure against such leakage, it is possible to obviate the adverse effects of such leakage and in a comparatively simple manner with little expense.

In a valve assembly constructed in accordance with this invention, a valve unit having several poppet and pilot valve sets are provided in which each poppet member is movable between a closed position in which a valve face thereof engages a valve seat between first and second passages in a valve body and an open position in which the valve face is moved away from the valve seat with the valve body having internal surfaces defining a plurality of bores receiving the piston portion of the poppet members and defining therewith spaces of variable volume, the volume of such spaces being increased with movement of the poppet members toward closed positions. The pilot valves control flow through control passage means between the variable volume spaces and a low pressure region.

In accordance with a very important feature of the invention, first and second restricted flow means are provided through the body of each poppet between the variable volume space and the first and second passages. Such restricted flow means are operative upon closure of the pilot valve means to develop a static pressure in the variable volume space corresponding to the pressure in the one of the first and second passages which has the higher pressure therein to move the poppet member to its closed position and to hold it in its closed position in response to pressures applied from either of such passages. Thus the movement of the poppet member to its closed position may be initiated from pressure in one of the passages but even if the pressure in that passage should drop, the poppet member can remain in its closed position in response to pressure in the other of the passages. It is found, moreover, that the poppet member can be so held in its closed position even with the leakage which apparently causes malfunctions of prior valve constructions.

In accordance with important specific features of the invention, each of the restricted flow means includes check valve means for preventing flow through the restricted flow means away from the variable volume space and the restricted flow means include a pair of passages in the poppet member with the check valve being disclosed in such passages, being preferably in the form of ball members disclosed in larger diameter portions of such passages and engagable with shoulders at the junctions between such larger diameter portions and smaller diameter portions.

In any valve assembly the first valve unit, consisting of a pilot valve and a poppet and the necessary fluid delivery conduits, is usually a normally open unit that allows fluid flow from the pump to the reservoir. The subsequent valve units, also consisting of a pilot valve and a poppet and the necessary fluid delivery conduits, are normally closed valves that prevents fluid flow from the pump to the motor. To get fluid to the motor a subsequent valve unit is opened through energizing its pilot valve which allows the poppet to open while simultaneously closing the first valve unit by energizing its solinoid to move the pilot valve to a closed position. The first poppet will then interrupt flow between the pump and the reservoir.

Preferably and in accordance with further features, a plurality of valve units, augmenting the basic system of a pair of valve units, one normally open and one normally closed, are provided in a common assembly and are arranged for control of a plurality of hydraulic cylinders or motors and for connection to a hydraulic pump and reservoir. The construction of the valve units including the provision of two restricted flow passages is especially advantageous in such an assembly.

This invention contemplates other objects, features and advantages which will become more fully apparent from the following detailed description taken in conjunction with the accompanying drawings.

DESCRIPTION OF A PREFERRED EMBODIMENT

Figure 1:
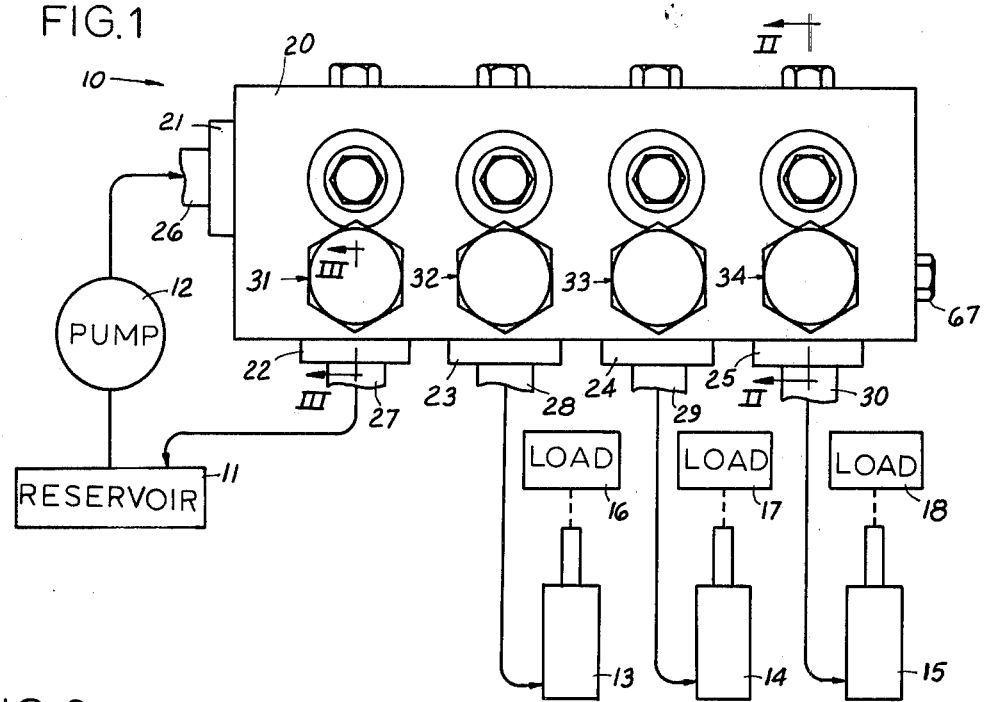
FIG. 1 is a top plan view of a valve assembly according to the invention, showing diagrammatically the connection of the valve assembly in a hydraulic system.

Reference numeral 10 generally designates a valve assembly constructed in accordance with the principles of this invention. As diagrammatically illustrated, the assembly 10 is usable for selectively controlling flow of fluid from a reservoir 11 and through a pump 12 to one or a plurality of motors such as hydraulic cylinders 13, 14 and 15 used to lift and control lowering of loads 16, 17 and 18 such as, for example, sections of a multi-unit plow. The assembly 10 is usable in a variety of applications and may be used to control hydraulic motors as well as hydraulic cylinders.

The assembly 10 includes a body member 20 having openings and a plurality of passages which receive fittings 21-25 to connect to conduits 26-30, respectively extending to the outlet of pump 12, to the reservoir 11 and to the cylinders 13, 14 and 15. Four solenoids 31—34 are provided for controlling pilot valves of four valve units to thereby control four poppet valves thereof operative between a common passage which communicates with the outlet of the pump 12 and the openings into which the conduit fittings 22-25 are secured, to thereby control communication between the outlet of the pump 12 and the reservoir 11 and cylinders 13-15.

In one mode of operation, all of the solenoids 31—34 may be normally de-energized and a pilot valve controlled by solenoid 31 may be normally open to permit free flow of fluid from the pump outlet and through the first valve unit to the reservoir 11, while the pilot valves controlled by solenoids 32-34 may be normally closed. When it is desired to lift one or more of the loads 16-18, the solenoid 31 is energized to close the poppet valve of the first unit and to establish a high pressure in a common passage 43 communicating with the poppet valves of the second, third and fourth units. Thereafter, any one of the solenoids 32, 33 or 34 may be energized to cause flow from the common passage to the associated one of the cylinders 13-15 and to lift the associated one of the loads 16-18. When the load has been lifted or otherwise appropriately displaced the solenoid 31 is de-energized thus returning its associated poppet to its normally open position. The load associated solenoid is simultaneously de-energized however, this closes the related poppet, preventing the load from dropping. When it is desired to lower one of the loads 16-18, the solenoid 31 is left de-energized and one of the solenoids 32, 33 or 34 is energized to allow flow from the associated cylinder to the common passage 43 and thence through the poppet valve of the first unit to the reservoir 11. In the single acting cylinders shown, the loads, which may be associated with the cylinders, will urge the piston and piston rod into the cylinder displacing fluid from the cylinder. The pump will not affect the cylinder position as the flow from the pump will take the unrestricted path to the reservoir rather than doing work at the cylinder. The flow will follow the path of least resistance.

It is noted that opening of one of the poppet valves at an improper time and the resulting lowering of the associated load may have serious consequences and it is thereby important in the illustrated system and in systems similar thereto that each of the poppet valves remain reliably closed after the proper elevation of the associated load is established, to maintain such elevation until such time as it is desired to effect a change in elevation thereof. The valve assembly 10 of this invention is so constructed as to insure proper operation of the poppet valves of the assembly with a very high degree of reliability.

Figure 2:
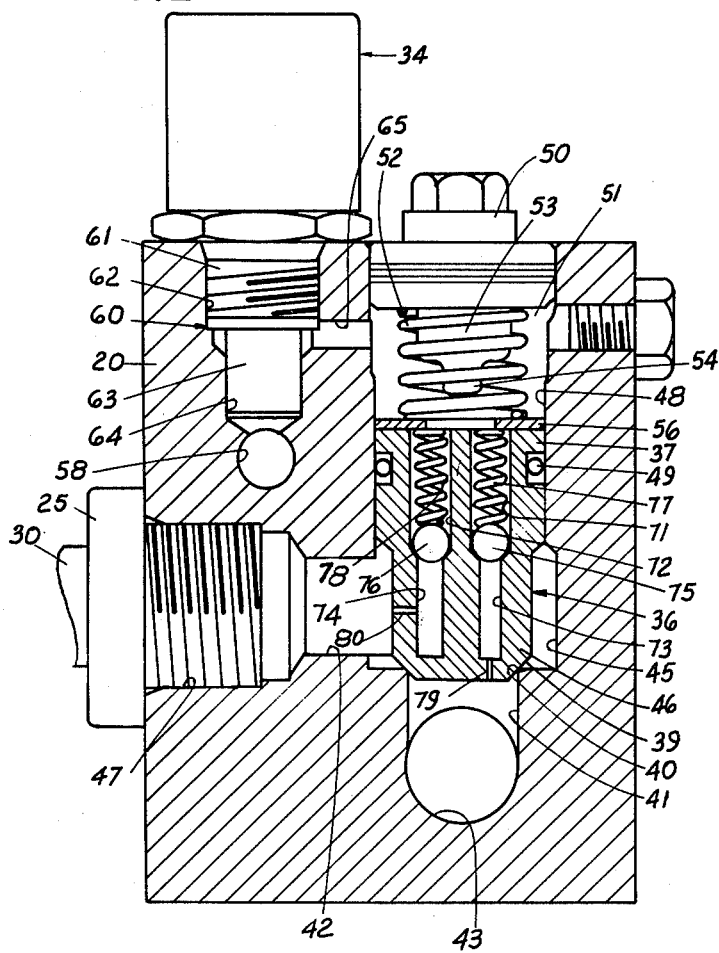
FIG. 2 is a cross-sectional view taken substantially along line II—II of FIG. 1, showing a construction of one of four valve units of the assembly.

FIG. 2 is a cross-sectional view illustrating the construction of the fourth valve unit of the assembly 10, controlled by the solenoid 34, the other units being similar thereto. A poppet member 36 is provided having a piston portion 37 at an upper end thereof and formed with an annular valve face 39 at the lower end or valve face portion thereof, face 39 being engageable with an annular valve seat 40 in a bore 48 having a lower portion as a passage 41 in the body 20. The lower portion passage 41 of the bore 48 extends downwardly to a common passage 43 which communicates with the lower bore passages of the other valve units similar to passage 41. One end of the common passage 43 is closed by a suitable plug while the opposite end thereof receives the fitting 21, passage 43 being thereby in communication with the outlet of the pump 12 through the conduit 26. An annular chamber 45 surrounds an intermediate portion 46 of the poppet member 36 which is intermediate the piston portion 37 and the valve face 39. Each valve unit is accessed by a delivery passage 42 in communication with the common passage 43 when the poppet member 36 is unseated from the valve seat 40. The delivery passage 42 receives the fitting 25, passage 42 being thereby in communication with the hydraulic cylinder 15 through the conduit 30.

The body member 20 is formed with a bore 48 receiving the piston portion 37 of the poppet member 36 which may preferably be formed with an annular groove receiving a sealing ring 49. The bore 48 is closed at its upper end by a suitable plug 50 and an internal space 51 is thus defined. The volume of space 51 is varied in accordance with movement of the poppet member 36, being increased as the poppet member is moved downwardly toward the illustrated closed position in which the valve face 39 engages the valve seat 40. A coiled compression spring 52 may be provided to urge the poppet member downwardly, disposed in the space 51 between the plug 50 and the upper end of the poppet member 36, the plug 50 having a central portion 53 extending downwardly within the spring 52 and also having a projecting portion 54 of reduced diameter forming a stop which limits upward movement of the poppet member 36. A washer 56 is disposed between the lower end of the spring 52 and the upper end surface of the poppet member 36.

Figure 3:
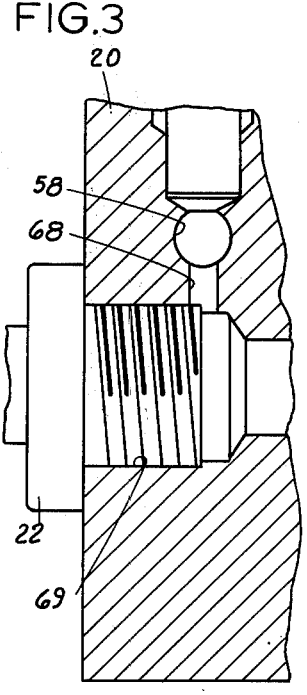
FIG. 3 is a cross-sectional view taken substantially along line III—III of FIG. 1, showing how communication is obtained between a reservoir and an exhaust passage communicating with pilot valves of the assembly.

A flow path is provided between the space 51 and an exhaust passage 58 which communicates with the reservoir, flow through such paths being controlled by a pilot valve 60 controlled by the solenoid 34. The pilot valve has an upper body portion 61 secured in an upper larger diameter portion 62 of an opening in the valve body 20 and has a lower portion 63 disposed in a lower reduced diameter portion 64 of the opening in the valve body 20. The transverse passage 65 is provided between the space 51 and the lower portion of the opening portion 62, while the lower end of the opening portion 64 communicates with the passage 58 which extends longitudinally in the valve body under the pilot valves of all four valve units. One end of the passage 58 is closed by a plug 67 (FIG. 1) and as shown in FIG. 3, a vertical passage 68 is provided between the passage 58 and an opening 69 in the valve body which receives the fitting 22 for the conduit 27, coupled to the fluid reservoir 11. Thus passage 58 directly communicates at all times with the fluid reservoir 11.

The pilot valve 60 is operable between a fully open position in which fluid may flow freely between the space 51 and the reservoir 11 and a fully closed position in which fluid flow is blocked off. It is noted that the construction of the pilot valve 60 is not illustrated in detail, because it is a standard type of commercially available solenoid operated valve. It may preferably be of a type having a small orifice controlled by a solenoid armature to control flow of fluid for control of a piston member which controls a larger orifice, in a manner such that the force required for operation and thereby the required size of the solenoid are minimized.

In accordance with this invention, a pair of restricted flow means are provided between space 51 and the common passage 43 and the delivery passage 42, operative when the pilot valve 60 is closed, to permit flow of fluid from one or the other of the passages 43 or 42 to the space 51 and to develop a static pressure in the space 51 corresponding to the static pressure of whichever of the passages 43 or 42 has the higher pressure therein, to move the poppet member 36 to its closed position and to hold it in its closed position in response to pressure applied to either the common passage 43 or the delivery passage 42.

In particular, two parallel bores, forming a first and a second restricted flow passage, are provided in the poppet member 36 which have upper larger diameter portions 71 and 72 open at their upper ends to communicate with the space 51 and having lower smaller diameter portions 73 and 74. Ball check valve members 75 and 76 in the upper portions 71 and 72 seat against shoulders formed between the lower ends of the upper portions 71 and 72 and the lower portions 73 and 74, with coiled compression springs 77 and 78 being provided in the portions 71 and 72, acting between the washer 56 and the ball check members 75 and 76 to urge the members 75 and 76 into sealing engagement with the shoulders. A small diameter port or first flow restricting orifice 79 extends downwardly from the lower end of the portion 73 to the lower end of the poppet member 36, to communicate with the lower portion of bore 48 and common passage 43. Another small diameter port or second flow restricting orifice 80 extends transversely from the bore portion 74 to communicate with the delivery passage 42.

In operation, when the pilot valve 60 is closed, fluid may flow upwardly from one or the other of the passages 43 or 42 to one or the other of the ports 79 or 80, upwardly through one or the other of the bore portions 73 or 74, past one or the other of the ball check members 75 or 76 and through one or the other of the bore portions 71 or 72 and into the space 51. As a result, a static pressure is developed in the space 51 corresponding to the static pressure in whichever of the passages 43 or 42 has the higher pressure therein. Such static pressure operates against the upper end of the poppet member 36 to move it downwardly to its closed position and to hold it in its closed position. It is noted that the effective area of the upper end of the poppet member 36 against which the pressure is applied in space 51 is substantially greater than that of the lower end of the poppet member 36 below the seat 40 and is also substantially greater than the effective area of the portion of the poppet member 36 above the seat 40 against which pressure from the delivery passage 42 is applied. As a result, when the pressure in either of the passages 43 or 42 is substantially greater than that in the other, the poppet member will be moved and held in its lower closed position.

This manner of operation is very important when the valve assembly is used in a system such as diagrammatically illustrated in FIG. 1 or systems similar thereto. For example, it may be assumed that one or more of the loads 16–18 is elevated, by first energizing the solenoid 31 of the first valve unit to close the pilot valve therein and thus cause movement of the associated poppet member to its closed position, to thereby establish high pressure in the common passage 43, after which, for example, the solenoid 34 may be energized to open the pilot valve 60 and to allow the poppet member 36 to move upwardly and establish communication between passages 43 and 42 and to supply fluid to the cylinder 15 and elevate the load 18. Thereafter, the solenoid 34 may be de-energized to close the pilot valve 60 and to cause the poppet member 36 to be moved downwardly to its illustrated closed position in the manner as described above. At the same time, the solenoid 31 may be de-energized to open the associated pilot valve and to establish communication between the outlet of the pump and the reservoir 11 with a continuous recirculation of fluid through the first valve unit. At this time, there will be a high pressure in the passage 42, transmitted from the load 18 through the cylinder 15 and conduit 30 while the pressure in the passage 43 will be quite low. Should there be any leakage away from the space 51 which substantially decreases the static pressure therein, fluid may flow through port 80, the lower bore portion 74 and upwardly past the check valve member 76 and through bore portion 72 to maintain the static pressure in chamber 51 at a high value and to keep the poppet member 36 in its closed position. Accordingly, the load 18 will be maintained indefinitely in its elevated position until such time as it is desired to lower the same, accomplished by energizing the solenoid 34 to open the pilot valve 60.

It will be understood that modifications and variations may be made without departing from the spirit and scope of the novel concepts of this invention.

I claim as my invention:

1. In a valve assembly for directing fluid from a source of fluid flow and pressure the valve assembly comprising:
   a valve body having a plurality of passages including a common passage (43) having a source opening (21) for receiving fluid from a source of fluid, a first bore, having a valve seat, in communication with said common passage, a second bore, having a valve seat, in communication with said common passage, a first delivery passage in communication with said first bore and a first delivery opening (22), a second delivery passage in communication with said second bore and a second delivery opening, an exhaust passage (58) in communication with said first delivery passage, said exhaust passage having a first and a second transverse passage each allowing communication between respective first and second bores and said exhaust passage;

a normally open solenoid operated pilot valve located between said first transverse passage and said exhaust passage for controlling fluid flow therebetween;

a normally closed solenoid operated pilot valve located between said second transverse passage and said exhaust passage for controlling fluid flow therebetween;

a first poppet member carried in said first bore, said poppet member including a valve face portion engagable with said valve seat, an intermediate portion and a piston portion, said first poppet including a first restricted flow passage including a flow restricting orifice and a spring biased ball check valve, said first restricted flow passage extending through said first poppet member from said valve face portion thereof to said piston portion thereof, said first poppet also including a second restricted flow passage including a flow restricting orifice and a spring biased ball check valve, said second restricted flow passage extending through said first poppet member from said intermediate portion to said piston portion of said first poppet, said first poppet member being unseated when said first solenoid operated valve is open allowing fluid to pass from said common passage to said first delivery passage;

a second poppet member carried in said second bore, said second poppet member including a valve face portion engagable with said valve seat, an intermediate portion and a piston portion, said second poppet including a first restricted flow passage including a flow restricting orifice and a spring biased ball check valve, said first restricted flow passage extending through said second poppet member from said valve face portion thereto to said piston portion thereof, said second poppet also including a second restricted flow passage including a flow restricting orifice and a spring biased ball check valve, said second restricted flow passage extending through said second poppet member from said intermediate portion to said piston portion of said second poppet, said first and said second flow restricting orifices allowing fluid pressure from said common passage and said second delivery passage to be built up on said piston portion of said second poppet member when said second solenoid operated valve is closed so that said second poppet member will be urged to remain seated on said valve seat of said second bore;

said valve assembly allowing fluid flow from said source opening (21) to said common passage when said normally open solenoid is energized to a closed position thereby closing said first poppet member and said valve assembly allowing fluid flow from said common passage to said second delivery opening when said normally closed solenoid is energized to an open position thereby opening said second poppet member;

said valve assembly allowing fluid flow from said second delivery opening to said common passage when said normally closed solenoid is energized to an open position and said common passage provides fluid passage to said first delivery opening when said normally open solenoid is open, whereby fluid may pass from said second delivery opening to said first delivery opening. and said spring biased check valves being operative to hold said poppet members on their seats even in the event of leakage of fluid from above said piston portions.

2. The invention in accordance with claim 1 wherein said spring biased ball check valves of said first and said second poppet members include a ball carried in a vertical bore having two distinct concentric diameters said ball being urged by said biased spring carried in the larger diameter bore section to block fluid flow from the larger diameter bore to the smaller diameter bore.

3. The invention in accordance with claim 1 wherein: said valve body includes additional bores, each having a valve seat, in communication with said common passage, additional delivery passages and delivery openings in communication with said additional bores, additional transverse passages each allowing communication between respective additional bores and said exhaust passage;

additional normally closed solenoid operated pilot valves located between said additional transverse passages and said exhaust passage for controlling fluid flow therebetween;

additional poppet members carried in said additional bores, said additional poppet members each including valve face portions engagable with said valve seats, intermediate portions and piston portions, each of said additional poppet members including a first restricted flow passage including a flow restricting orifice and a spring biased ball check valve, said first restricted flow passage extending through said additional poppet members from said valve face portions thereof to said piston portion thereof, said additional poppets also including second restricted flow passages including a flow restricting orifice and a spring biased ball check valve, said second restricted flow passage extending through said additional poppet members from said intermediate portion to said piston portion of said additional poppet members, said first and said second flow restricting orifices allowing fluid pressure from said common passage and said second delivery passage to be built up on said piston portion of said additional poppet members wherein said additional solenoid operated valves are closed whereby said additional solenoid operated valves are closed whereby said additional poppet members will be urged to remain seated on said valve seats of said additional bores.

* * * * *